C. T. DARBY.
GEARING.
APPLICATION FILED APR. 7, 1911.
1,026,736.
Patented May 21, 1912.
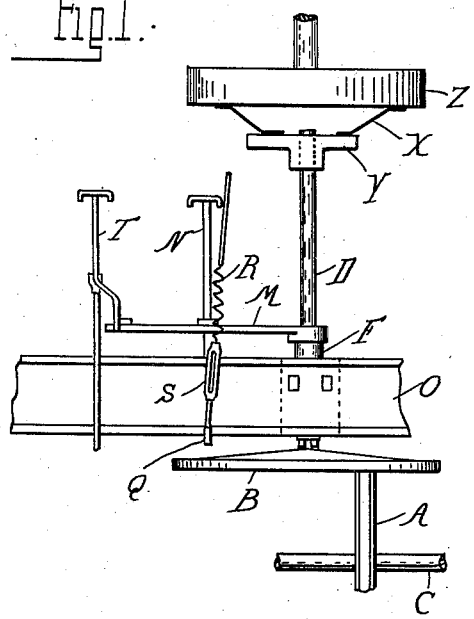
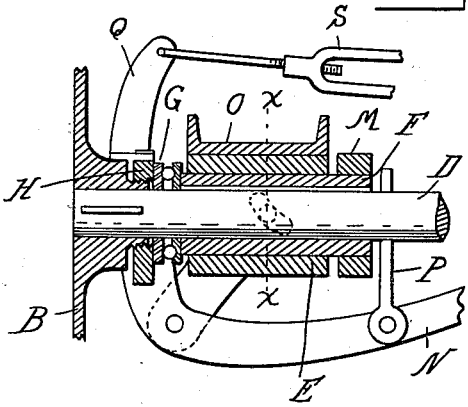
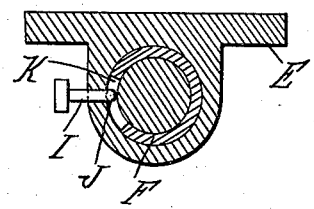
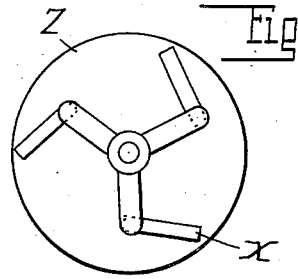
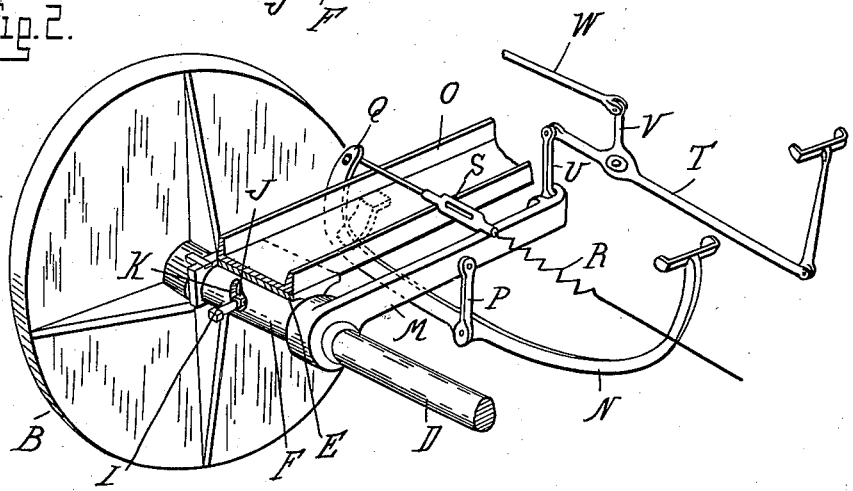
Witnesses
Inventor
Clifford T. Darby
By Whittemore Hulbert & Whittemore
Atty's

UNITED STATES PATENT OFFICE.

CLIFFORD T. DARBY, OF DETROIT, MICHIGAN, ASSIGNOR TO STEPHEN A. GRIGGS, TRUSTEE, OF WALKERVILLE, CANADA.

GEARING.

1,026,736.  Specification of Letters Patent.  Patented May 21, 1912.

Application filed April 7, 1911. Serial No. 619,607.

*To all whom it may concern:*

Be it known that I, CLIFFORD T. DARBY, a citizen of the United States of America, residing at Detroit, in the county of Wayne and State of Michigan, have invented certain new and useful Improvements in Gearing, of which the following is a specification, reference being had therein to the accompanying drawings.

The invention relates to friction drive gears designed for use as a variable speed gearing for motor vehicles, and the invention consists in the means employed for maintaining a normal degree of friction between the coöperating parts, and further in various features of construction as hereinafter set forth.

In the drawings,—Figure 1 is a plan view of a drive mechanism; Fig. 2 is a perspective view thereof; Fig. 3 is a longitudinal section; Fig. 4 is a section on line $x$—$x$ Fig. 3; and Fig. 5 is an end view of the fly wheel.

A and B are coöperating friction drive wheels which are mounted upon the shafts C and D perpendicular to each other. The wheel A is adjustable axially toward or from the center of the wheel B being operated by any suitable adjusting mechanism (not shown). The wheel B is held in contact with the periphery of the wheel A by mechanism of the following construction: E is a bearing for the shaft D adjacent to the wheel B, F is a sleeve or bushing intermediate the bearing and the shaft, and G is a thrust bearing between the sleeve F and a collar H secured to the shaft. The sleeve F has a spiral engagement with the bearing E by which a rotation of said sleeve will cause a longitudinal movement thereof and through the thrust bearing H will impart a similar movement to the shaft D and wheel E. As shown, this spiral engagement is formed by a pin I in bearing E which is provided with a roll J at its inner end engaging a spiral slit K in the sleeve. Secured to one end of the sleeve is a lever M by which a rotary movement through a limited angle may be imparted. N is a pedal lever fulcrumed upon a frame O of the vehicle and connected by a link P with the lever M. This pedal lever N has an extension Q beyond its fulcrum which is connected to a tension spring R through the medium of a turn buckle S, the opposite end of the spring being anchored to the frame.

The arrangement just described is such that tension of the spring R will actuate the pedal and through it the link P and lever M will rotate the sleeve F. This will cause a spiral movement of said sleeve which will advance the same longitudinally and through the thrust bearing H will move the shaft and wheel B pressing the latter into frictional contact with the sleeve A. The tension of the spring may be adjusted by the turn buckle S, but is normally set so as to produce just that degree of friction necessary for the driving wheels under ordinary load, but when there is an excessive load as for instance in overcoming the inertia of the machine in starting, a greater degree of friction is necessary. This may be supplied by the operator by pressure of the foot on the pedal N which will act in conjunction with the spring tension.

For releasing the friction engagement a second pedal lever T is preferably employed, this being connected by a link U with the lever M, but the arrangement is such as to actuate said lever in the opposite direction. The pedal lever T is also provided with the arm V which is connected by a rod W to the brake mechanism of the vehicle (not shown).

For withdrawing the friction wheel B from contact with the wheel A, a yielding pressure is normally applied to move the shaft D longitudinally. This as shown, is produced by springs X which connect a collar Y on said shaft D with the fly wheel Z of the motor. The springs X also form the driving links for communicating the rotary motion of the fly wheel to the shaft D, and perform the further function of a universal joint permitting a slight disalinement in the motor and shaft D.

With the construction as described in operation, the friction drive gear is under direct control of the operator through the pedals T and N, and the spring R is adjusted in tension to produce the necessary friction for driving normal loads. When however, tension force is required the pressure on the pedal N will supply an added friction and on the other hand, when the mechanism is to be stopped a pressure on the pedal T will release the friction and apply the brake.

What I claim as my invention is:

1. The combination with coöperating friction wheels arranged at substantially right angles to each other, of a lever for pressing the friction wheels into contact with each other, and a spring operating upon said lever to supply a normal degree of friction.

2. The combination with coöperating friction wheels, one of which is adjustable axially toward or from the center of the other, of a lever for pressing the coöperating friction wheels into contact, and a tension spring operating upon said lever to supply a normal degree of friction.

3. The combination with a friction drive gearing, of a thrust bearing for one of the friction elements, a screw for adjusting said thrust bearing, a pedal lever for actuating said screw, and a spring operating upon said pedal lever to supply a normal degree of friction between the coöperating friction elements.

4. In a friction drive gearing, the combination with a friction disk, of a shaft on which said disk is mounted, a bearing for said shaft, a sleeve or bushing intermediate said shaft and bearing and having a spiral engagement with the latter, a thrust bearing for said shaft on said sleeve, a rock lever for adjusting said sleeve, a pedal lever connected with said rock lever, and a tension spring for actuating said pedal lever and supplying a normal degree of friction.

5. In a friction drive gearing, the combination with a friction wheel, of a shaft on which said wheel is mounted, a bearing for said shaft, a sleeve intermediate said shaft and bearing having a spiral engagement with the latter, a thrust bearing for said shaft upon said sleeve, a lever for rocking said sleeve, a pair of pedals for actuating said lever in opposite directions, and a spring for actuating one of said pedals and supplying the normal degree of friction to said gear.

6. In a friction drive gearing, the combination with a friction wheel, of a shaft on which said wheel is mounted, a bearing for said shaft, a sleeve or bushing between said bearing and shaft having a spiral engagement with the former, a rock arm for actuating said sleeve, links extending in opposite directions from said rock arm, a pair of pedal levers respectively connected to said links, and a spring for actuating one of said pedal levers to supply the normal degree of friction to said gear.

7. In a friction drive gearing, the combination with coöperating friction wheels, of a shaft on which one of said wheels is mounted, a drive shaft in alinement with said shaft, means for adjusting said friction wheel shaft longitudinally to engage said friction wheel with its coöperating member, and a resilient arm connection between said drive shaft and frictional wheel shaft forming a means for returning the latter.

8. In a friction drive gearing, the combination with coöperating friction wheels, of a shaft on which one of said wheels is mounted, a drive shaft in alinement with said shaft, means for adjusting said friction wheel shaft longitudinally to engage said friction wheel with its coöperating member, and a resilient arm connection between said drive shaft and frictional wheel shaft forming means for returning the latter, said arm permitting a relative lateral movement between the shafts.

9. In a friction drive gearing, the combination with coöperating friction wheels, of a shaft in which one of said wheels is mounted, means for moving said shaft longitudinally to press said wheels into engagement, a rotary drive member axially alined with said friction wheel shaft, a collar on said friction wheel shaft, and a resilient arm connecting said drive member with said collar forming a flexible connection between said member and shaft and serving as a means for retracting said friction wheel shaft.

In testimony whereof I affix my signature in presence of two witnesses.

CLIFFORD T. DARBY.

Witnesses:
JAMES P. BARRY,
W. K. FORD.

---

Copies of this patent may be obtained for five cents each, by addressing the "Commissioner of Patents, Washington, D. C."